US008812951B1

(12) United States Patent
White (10) Patent No.: US 8,812,951 B1
(45) Date of Patent: Aug. 19, 2014

(54) PUBLISHER FORMATTING CONTROLS (75) Inventor: Christopher Allan White, Redwood City, CA (US)

(73) Assignee: Amazon Technologies, Inc., Reno, NV (US)

( * ) Notice: Subject to any disclaimer, the term of this patent is extended or adjusted under 35 U.S.C. 154(b) by 704 days.

(21) Appl. No.: 12/980,194

(22) Filed: Dec. 28, 2010

(51) Int. Cl.
*G06F 17/00* (2006.01)
*G06F 17/21* (2006.01)
*G06F 17/24* (2006.01)

(52) U.S. Cl.
CPC ............ *G06F 17/211* (2013.01); *G06F 17/24* (2013.01)
USPC ............ 715/249; 715/200; 715/273; 715/255

(58) Field of Classification Search
CPC ................................ G06F 17/211; G06F 17/24
USPC ......... 715/200, 234, 238–239, 248–252, 273, 715/255, 243
See application file for complete search history.

(56) References Cited

U.S. PATENT DOCUMENTS

| 5,845,303 | A * | 12/1998 | Templeman | 715/255 |
| 5,897,644 | A * | 4/1999 | Nielsen | 715/210 |
| 6,477,549 | B1 * | 11/2002 | Hishida et al. | 715/201 |
| 7,428,725 | B2 * | 9/2008 | Niyogi et al. | 717/109 |
| 7,568,154 | B2 * | 7/2009 | Salesin et al. | 715/243 |
| 7,694,221 | B2 * | 4/2010 | Fortes | 715/249 |
| 7,861,166 | B1 * | 12/2010 | Hendricks | 715/277 |
| 7,900,137 | B2 * | 3/2011 | Ivarsoy et al. | 715/238 |
| 8,423,889 | B1 * | 4/2013 | Zagorie et al. | 715/255 |
| 2002/0107891 | A1 * | 8/2002 | Leamon et al. | 707/513 |
| 2003/0229845 | A1 * | 12/2003 | Salesin et al. | 715/500 |
| 2004/0012627 | A1 * | 1/2004 | Zakharia et al. | 345/744 |
| 2004/0107403 | A1 * | 6/2004 | Tetzchner | 715/513 |
| 2006/0041835 | A1 * | 2/2006 | Chen et al. | 715/509 |
| 2006/0048051 | A1 * | 3/2006 | Lazaridis | 715/517 |
| 2006/0101162 | A1 * | 5/2006 | Ivarsy et al. | 710/8 |
| 2006/0184638 | A1 * | 8/2006 | Chua et al. | 709/217 |
| 2007/0250768 | A1 * | 10/2007 | Funakami et al. | 715/521 |
| 2008/0215966 | A1 * | 9/2008 | Suarez | 715/252 |
| 2008/0295019 | A1 * | 11/2008 | Han et al. | 715/781 |
| 2011/0087955 | A1 * | 4/2011 | Ho et al. | 715/230 |
| 2011/0122155 | A1 * | 5/2011 | Zechlin | 345/660 |
| 2012/0005565 | A1 * | 1/2012 | Chen et al. | 715/205 |

OTHER PUBLICATIONS

Spyglass, "Spyglass Prism: Concepts and Applications", Spyglass, 1997, pp. 1-8 + 2 cover pages (10 pages).*

* cited by examiner

*Primary Examiner* — William Bashore
*Assistant Examiner* — David Faber
(74) *Attorney, Agent, or Firm* — Lee & Hayes, PLLC (57) ABSTRACT

Content providers may specify special formatting instructions to manage formatting of content that is ultimately displayed by electronic devices. The formatting instructions may include formatting that is not apparent from an original format of the content. The formatting instructions from a content provider may override default formatting that is used by a viewing application on the electronic device or a host (intermediary) that formats the content for the electronic device, which would otherwise control a format of the content. The formatting instructions may be based on attributes of the electronic devices, such as display size, display type, etc. By enabling content providers to specify these special formatting instructions, the content providers may retain control of an ultimate look and function of the content when the content is formatted for a particular electronic device.

27 Claims, 8 Drawing Sheets

PUBLISHER FORMATTING CONTROLS

BACKGROUND

Content is increasingly distributed in electronic form to an array of users for use on computing devices. The content may include media such as books, magazines, newspapers, newsletters, manuals, guides, references, articles, reports, documents, blogs, or any other type of content that includes text, images, audio, and/or video. The content is typically transmitted to electronic devices with formatting instructions that enable a viewer application on the electronic device to layout the content for display to a user.

Formatting of content has to be performed carefully as to avoid disruption, obscuring, or otherwise unpleasant or irregular display of content. For example, when formatting content, it is often important to ensure that images are not distorted or that content is not lost (e.g., not fully visible). Often, when content is displayed across a variety of different display sizes, the content should be formatted to make best use of available display space.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

When content from a content provider (e.g., publisher, author, etc.) is laid out for display by a server or an electronic device, the content may be formatted in various ways to make use of available display space that is provided by the electronic device. Typically, the content is laid out using basic formatting information that is integrated with the content, such as hypertext markup language (HTML) formatting instructions included in the content or physically identified formatting (e.g., formatting evident from a scanned optical character recognition (OCR) process, etc.). When a display is small, then default formatting may reduce some objects in size and include links to corresponding full size objects or objects presented in full screen mode. Besides resizing objects, such as images, tables, and videos, the formatting may also pertain to pagination of objects or other alterations and representations of objects, which may be based on a display size or other attributes of the electronic device, such as processing capabilities, color display capabilities, and so forth.

In accordance with various embodiments, publishers or other content providers may specify special formatting instructions to manage formatting of the content by the electronic devices, which may not be apparent from an original format of the content. The formatting instructions from a content provider may override default formatting that is used by a viewing application on the electronic device or a host (intermediary) that would otherwise control a format of the content. For example, a default formatting by a host or viewing application may resize images to fit on a page regardless of the final size of the image. The content provider, however, may provide a formatting instruction to add an image viewer (e.g., controls for zooming/panning, etc.) for an image that is reduced in size more than a threshold amount. The special format (e.g., the added viewer, etc.) would otherwise not be apparent without the inclusion of the formatting instruction with the content. By enabling content providers to specify these special formatting instructions, the content providers may retain control of an ultimate look and function of the content when the content is formatted for a particular electronic device.

The techniques and systems described herein may be implemented in a number of ways. Example implementations are provided below with reference to the following figures.

Illustrative Environment

Figure 1:
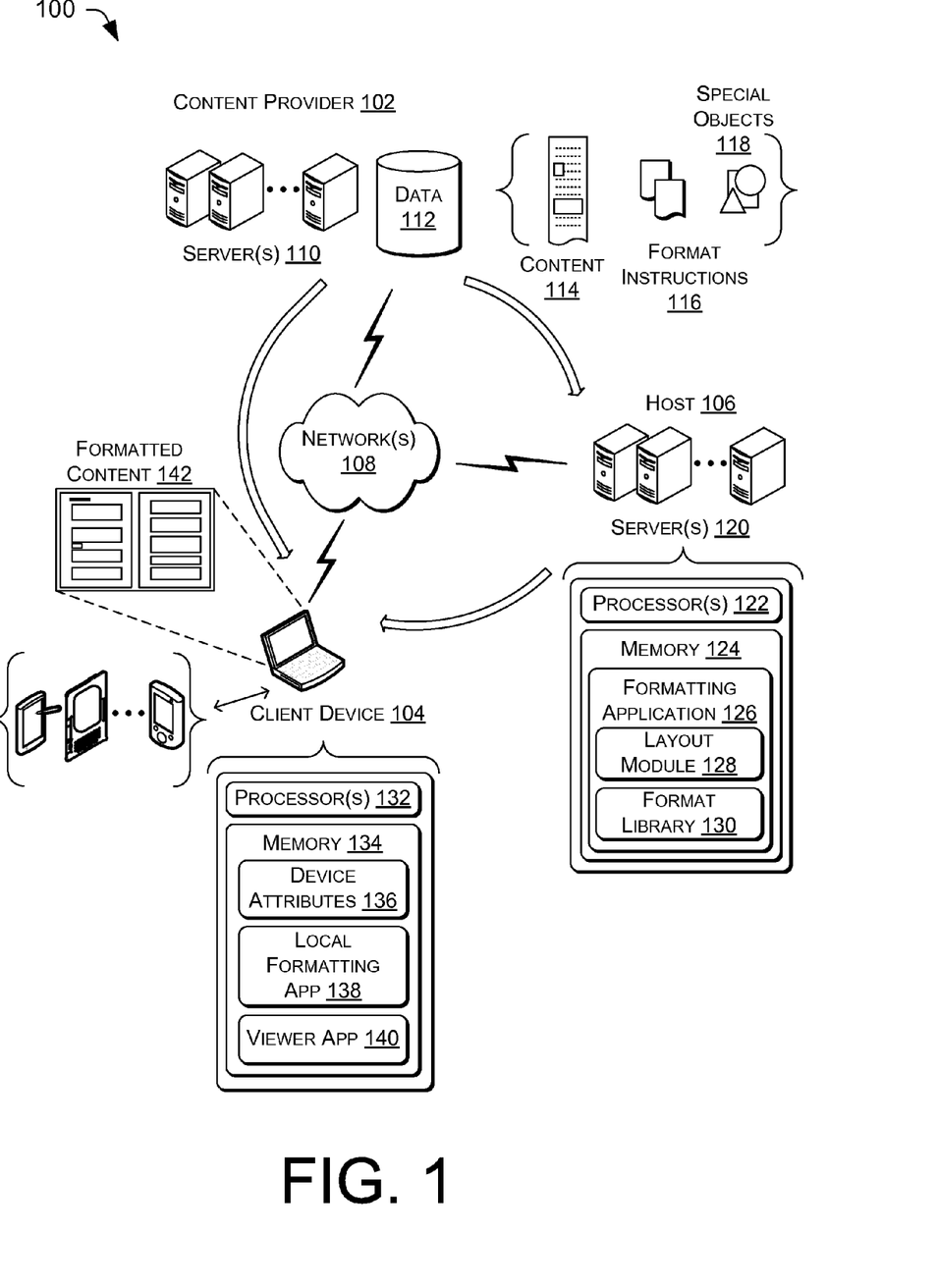
FIG. 1 is a schematic diagram of an illustrative computing environment that provides formatting instructions from a content provider to format content that is transmitted to a client device.

FIG. 1 is a schematic diagram of an illustrative computing environment 100 that provides formatting instructions from a content provider to format content that is transmitted to a client device. The environment 100 may include a content provider 102 that is a source of a document to be ultimately transmitted to a client device 104. For example, the content provider 102 may be a publisher or author of the content that is originally produced in a first format, such as in a physical bound volume (e.g., book, magazine, etc.) or as an electronic document of a known size (e.g., a portable document format (PDF), etc.). The content may include formatting that can be deduced from the content, by examination of the document, such as paragraph alignment, spacing, and so forth. However, some aspects of the formatting may not be apparent from the content when the content is modified for use by different types of client devices. The modifications may include formatting of resized images (e.g., when to add a special viewer), separation of objects during pagination, and so forth.

In some embodiments, the content provider 102 may transmit content to a host 106 as an intermediary prior to receipt of the content by the client device 104. For example, the host 106 may receive the content from the content provider 102, implement any formatting instructions with the content, and then distribute the formatted content to the client device 104. However, the content provider 102 may also transmit the content directly to the client device 104, as shown in FIG. 1. The content provider 102, the client device 104, and the host 106 may be in communication via one or more networks 108.

The content provider 102 may include servers 110 and data storage 112 to manage and transmit content 114. In some embodiments, the content 114 may be a continuous flow document that does not include pagination and is intended for viewing with an electronic device that is capable of scrolling through the continuous flow document. For example, an HTML document is a common example of a continuous flow document that is typically viewed by a browser running on the client device 104. The content 114 may include text, images, tables, videos, and/or applications for consumption by a user of the client device 104. In some embodiments, the content 114 may include default formatting instructions such as when the content is an HTML document.

In addition to the content 114, the content provider 102 may store and transmit formatting instructions 116 along with the content 114. The formatting instructions 116 may provide formatting instructions that are based on device attributes (e.g., display size, display type, performance, etc.) and are otherwise not apparent from the content itself. The formatting instructions 116 may apply to at least a portion of objects in the content 114 and are different than the default format instructions that may be included with the content. In some embodiments, the formatting instructions may be categorized by a device type (e.g., tablet, mobile phone, notebook computer, device model, etc.). However, the formatting instructions 116 may be generic as to particular devices and instead rely on threshold values for particular attributes of the device (e.g., screen is less than a threshold size, etc.).

In addition, the content provider 102 may store special objects 118 that may correspond to and be different than objects in the content 114 and be used based on the formatting instructions. For example, the content 114 may include a table of statistical data. The formatting instructions 116 may specify that the table should only be displayed in full if a display size of the client device 104 is at least a threshold size. When the display size is less than the threshold size, the formatting instructions 116 may direct the client device 104 to show the special object 118 that corresponds to the table, such as a simplified table image or icon that shows representative data of the table.

In accordance with various embodiments, the host 106 may include servers 120 to format content, which may later be transmitted to the client device 104, such as in response to a user request for the content. The host 106 may be an electronic marketplace vendor, distributor, or other intermediary between the content provider 102 and the client device 104. In some embodiments, the host 106 may receive the content 114, the formatting instructions 116, and the special objects 118 from the content provider. The host 106 may store the data from the content provider 102, which may be modified by the host 106 prior to transmission to the client device 104, for example in a batch process to create versions of the content for known types of the client devices.

As illustrated, the host 106 is equipped with one or more processors 122 and memory 124. The memory 124 may be non-transitory computer-readable media and may include applications, modules, and/or data. In some embodiments, the memory 124 may include a formatting application 126, which may further include a layout module 128 and a format library 130. The formatting application may process the content 114 in accordance with the formatting instructions 116 and any applicable special objects 118 that are received from the content provider 102. In some embodiments, the formatting instructions 116 may include references to instructions in the format library 130, which may enable the layout module 128 to generate a layout of the content. The format library 130 may include various formatting tools and specifications, such as an image viewer that may add zoom/pan functionality to an image that is reduced in size.

In various embodiments, the layout module 128 may generate layouts for various different client devices, such as client devices having different display sizes, different processing speeds, different display types (e.g., electronic paper displays, liquid crystal displays, etc.), and so forth. For example, the layout module 128 may batch process content (e.g., magazines, books, etc.) from the content provider in advance of a request from a user of the client device 104 for the formatted content. The layout module 128 may request device information from the client device 104 prior to transmitting the formatted content to the client device. Ultimately, the host 106 may transfer the formatted content to the client device 104 for consumption by a user.

The client device 104 may be implemented as a personal computer as shown, or as other possible devices such as a tablet computer, a mobile telephone, a portable digital assistant (PDA), and electronic book reader, a television set-top box, a game console, and other electronic devices. A user may interact with the client device 104 to perform document-related functions, such as view documents obtained from the content provider 102 and/or host 106 via a network 108.

The client device 104 includes one or more processors 132 and memory 134. The memory 134 may be non-transitory computer-readable media and may include applications, modules, and/or data. In some embodiments, the memory 134 may include device attributes 136, which may be transmitted to the content provider 102 or the host 106 prior to receipt of the content 114. The client device 104 may also include a local formatting application 138 that may format the content 114 using the formatting instructions 116 and the special objects 118. In various embodiments, the local formatting application 138 may be similar or the same as the formatting application 126 on the host 106 and enable the client device 104 to receive the content directly from the content provider 102. For example, the local formatting application 138 may be used when the content and formatting instructions are received directly from the content provider 102 and not from the host 106, such as non-batch process content (news, low volume content, etc.). Further, the local formatting application 138 may also include modules that are the same or similar to the format library 130 and/or the layout module 128.

The client device 104 may also include a viewer application 140 to view formatted content 142, which may be formatted based on at least in part on the device attributes 136. The viewer application may be a browser or a dedicated document viewer, such as an electronic book (eBook) reader. When the viewer application 140 is resizable, the size of the viewer application may determine an implementation of the formatting instructions 116, such as by reformatting the content using the local formatting application 138 or retransmitting the content from the host 106 after reformatting the content using the formatting application 126. In some embodiments, the local formatting application 138 and the viewer application 140 may be integrated as a single application.

Illustrative Operation

Figure 2:
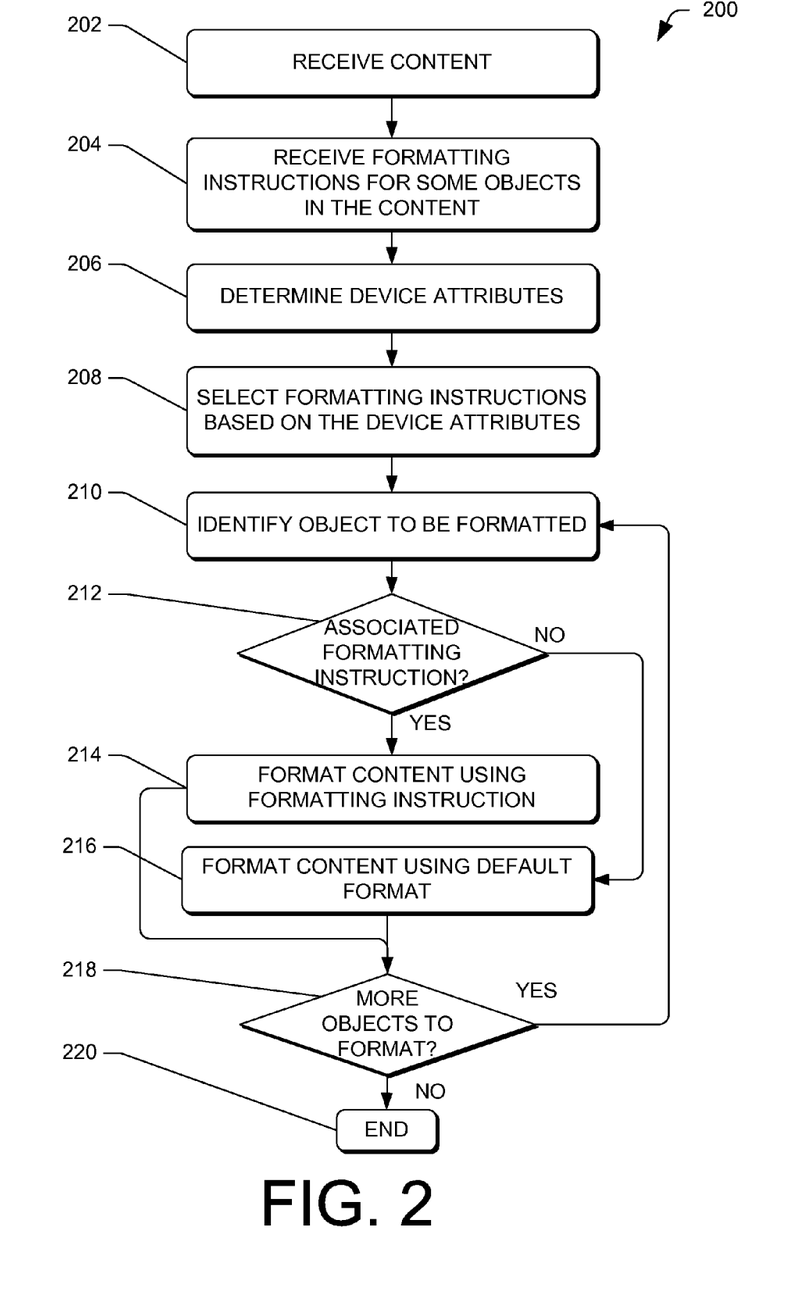
FIG. 2 is a flow diagram of an illustrative process to identify and use formatting instructions from the content provider to format content.

FIG. 2 is a flow diagram of an illustrative process 200 to identify and use formatting instructions from the content provider 102 to format content. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

The process 200 may be performed by the host 106 via the formatting application 126, the client device 104 via the local formatting application 138, or a combination of both. However, for illustrative purposes, the process 200 is described below as being performed by the host 106.

At 202, the host 106 may receive the content 114 from the content provider 102. At 204, the host 106 may receive the formatting instructions 116 for at least some of the objects in the content. As discussed above, the objects may include text, images, videos, audio files, tables, applications, or other types of objects. In some embodiments, the formatting instructions may include the special objects 118 that may be used in the content 114 in accordance with the formatting instructions 116.

At 206, the host 106 may determine device attributes. For example, the device attributes may be known for a particular process or user based on a user account or may be obtained by querying the client device 104. The device attributes may include a display size, a display type, processing speed, and/or other attributes of the client device 104.

At 208, the host 106 may select formatting instructions based at least in part on the device attributes when the content provider includes formatting instructions for specified device attributes.

At 210, the host 106 identify an object (e.g., a first object, etc.) to be formatted by the layout module 128. At 212, the layout module 212 may determine whether a formatting instruction is associated with the object which was received in the formatting instructions 116 at the operation 204. When a formatting instruction is included for the object, then the layout module 128 may format the content using the formatting instruction at 214. However, when no formatting instruction is included for the object, then the layout module 128 may format the content using a default format at 216.

At 218, the layout module 128 may determine whether additional objects need to be formatted in accordance with the operations 210 to 216. When no additional objects need to be formatted (e.g., all the objects in the content are formatted), then the process 200 may end at 220.

In accordance with one or more embodiments, the operation 204 that includes receiving the formatting instructions may occur just prior to or during access of the content to enable the content provider 102 or another party to modify the formatting instructions after the content has be transmitted to the client device 104 or the host 106. For example, when the content is formatted during a rendering process, the renderer (e.g., the viewer application 140) may request the formatting instructions from the content provider 102. The formatting instructions may be received in a separate transmission of data than the receiving of the content and/or may occur in response to access of the content by the client device 104.

In various embodiments, the operation 204 may occur during a same time period as the operation 202 of receiving the content, such as in a same transmission of data. Later, when the renderer is laying out the content, the renderer may inquire from the content provider 102 whether any changes have been made to the formatting instructions, which have been stored by the client device 104 (or possibly by the host 106). When the formatting instructions have changed, then the renderer may retrieve updated formatting instructions from the content provider, which may be used to replace or update the formatting instructions received at the operation 204.

Figure 3:
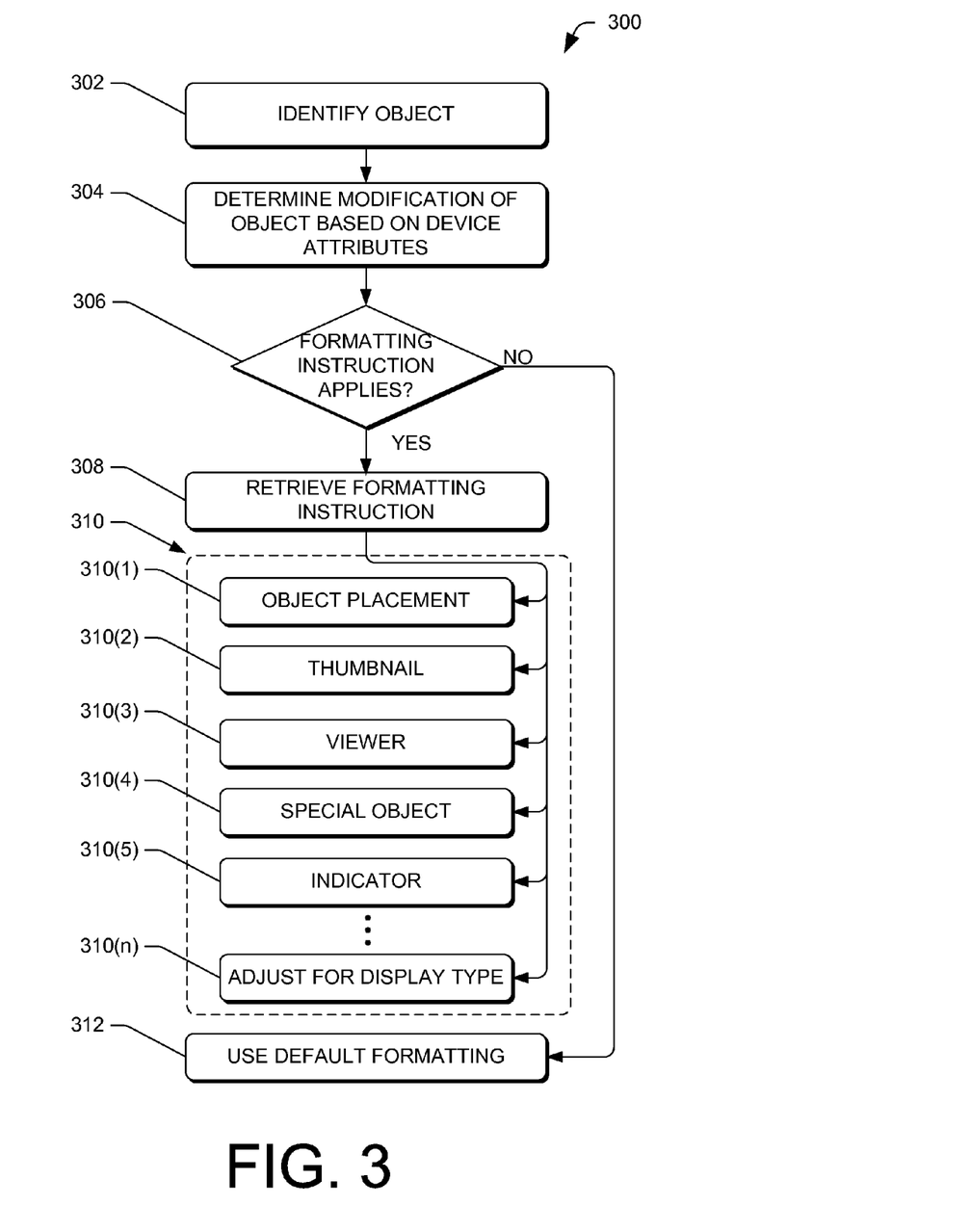
FIG. 3 is a flow diagram of an illustrative process to select formatting instructions from the content provider based on device attributes and/or display constraints.

FIG. 3 is a flow diagram of an illustrative process 300 to select formatting instructions from the content provider 102 based on device attributes and/or display constraints. The process 300 may include greater detail of the operations 210 to 216 described with reference to the process 200. Similar to the process 200, the process 300 may be performed by the host 106 via the formatting application 126, the client device 104 via the local formatting application 138, or a combination of both. However, for illustrative purposes, the process 300 is described below as being performed by the host 106.

At 302, the host 106 may identify an object to be formatted from the content 114. At 304, the host 106 may determine a modification of the object based on the device attributes, such as a display size, a display type, or other attributes of the device that may influence or dictate a format of the object. For example, when the client device 104 includes a relatively small display (e.g., less than a threshold size, etc.), then the object may need to be resized in order to fit within display space whereas the object may not require resizing when the display size is a larger size that the object.

At 306, the layout manager may determine whether one of the formatting instructions 118 from the content provider 102 applies to the object based on the determined modification of the object at the operation 304. For example, the modification at 304 may determine that the object is to include a 50% reduction in size in order to fit in an available display space of the client device 104. However, the formatting instructions may indicate that the object is to be replaced with one of the special objects 118, implemented with a viewer, or otherwise depicted different than the default format rather then include the modification determined at the operation 304, possibly based on the amount of the reduction of the object. In some embodiments, the formatting instructions may use or make calls to a format library 130, such as implement the viewer to add zoom/pan controls to an object that is an image.

When the layout module 128 determines that the formatting instructions apply to the object at the decision 306, the layout module 128 may retrieve the formatting instruction at 308 and apply the format at 310 using a variety of possible format instructions as discussed below.

At 310(1), the layout module 128 may determine an object placement in accordance with one of the formatting instructions 118. For example, the content provider 102 may include formatting instructions that indicate that a paragraph of text should not be broken at a page break when the content is paginated. Thus, the formatting at 310(1) would override a default format (e.g., breaking the paragraph at a page break), and instead may move the paragraph to a next page. The formatting at 310(1) may also perform the opposite and instead break the object when the default format includes moving the paragraph to a next page. The placement of the object may also include justification of the object, floating of the object, or other placement of the object relative to other objects (including text).

At 310(2), the layout module 128 may replace an object (e.g., image, audio file, video, etc.) with a thumbnail for the object. The thumbnail may include a link to the object, such as a link to a full screen representation of an image or video or an audio player associated with an audio file. The thumbnail may be generated by the content provider 102, the host 106, or the client device 104.

At 310(3), the layout module 128 may use a viewer to display the object. The viewer may include controls to view the object or otherwise access the object. In some embodiments, the viewer may include controls for navigating the object (pan, zoom, play, forward, etc.) and/or controlling sound of the object (e.g., audio or video files). In some embodiments, the viewer may extract representative parts of the object, such as frames from a video for display as a slide show or other depiction of the object. The viewer may be stored in the format library 130.

At 310(4), the layout module 128 may replace the object with one of the special objects 118. The special objects 118 may be associated with other objects in the content, but different from those objects. For example, when the object is a large table of data, the layout module 128 may replace the table with the special object (e.g., image, table, etc.) that is representative of a table of data. The special object may include an important part of the data, a link to the full table, and/or other data that may be displayed by the client device 104.

At 310(5), the layout module 128 may replace the object with an indicator that indicates the presence of additional content. For example, the object may be included in a sidebar (i.e., content in a margin of a page). In some embodiments, the layout module 128 may minimize or remove the sidebar in order to conserve valuable display space. The layout module 128 may include the indicator for the object that was previously located in the sidebar, which may enable a user to view the object upon selection of the indicator. The indicator may be a placeholder, a symbol, or another type of indication of a presence of an additional object.

At 310(n), the layout module 128 may adjust the object based on the display type. For example, when the display is an electronic paper display, the layout module 128 may replace colored objects with objects that more clearly show detail in black and white (assuming the electronic paper display is limited to black and white depiction of objects). The layout module 128 may also make other adjustments based on the display, such as refraining from providing videos when the display is an electronic paper display that has a slow refresh rate.

When the layout module 128 determines that the formatting instructions do not apply to the object at the decision 306, the layout module 128 may use default formats for the object, such as performing the modification determined at the operation 304.

Illustrative Formatting Instructions

FIGS. 4-8 show detailed pictorial flow diagrams that further illustrate possible formatting preferences that the content provider 102 may include in the formatting instructions 116 that are transmitted to the host 106 and/or the client device 104 along with the content 114. The formatting instructions 116 may include preferences to use the formatting techniques shown in these examples or refrain from using the formatting techniques, which may be contrary to default formatting of the content. The implementation of the formatting instructions may be contingent on attributes of the client device 104, and therefore may be implemented for some client devices and not implemented on other client devices. Further, other formatting instructions may be specified by the content provider 102 and may not be specifically shown in the FIGS. 4-8, but instead are described more generally above in the preceding description.

Example 1

Pagination

Figure 4:
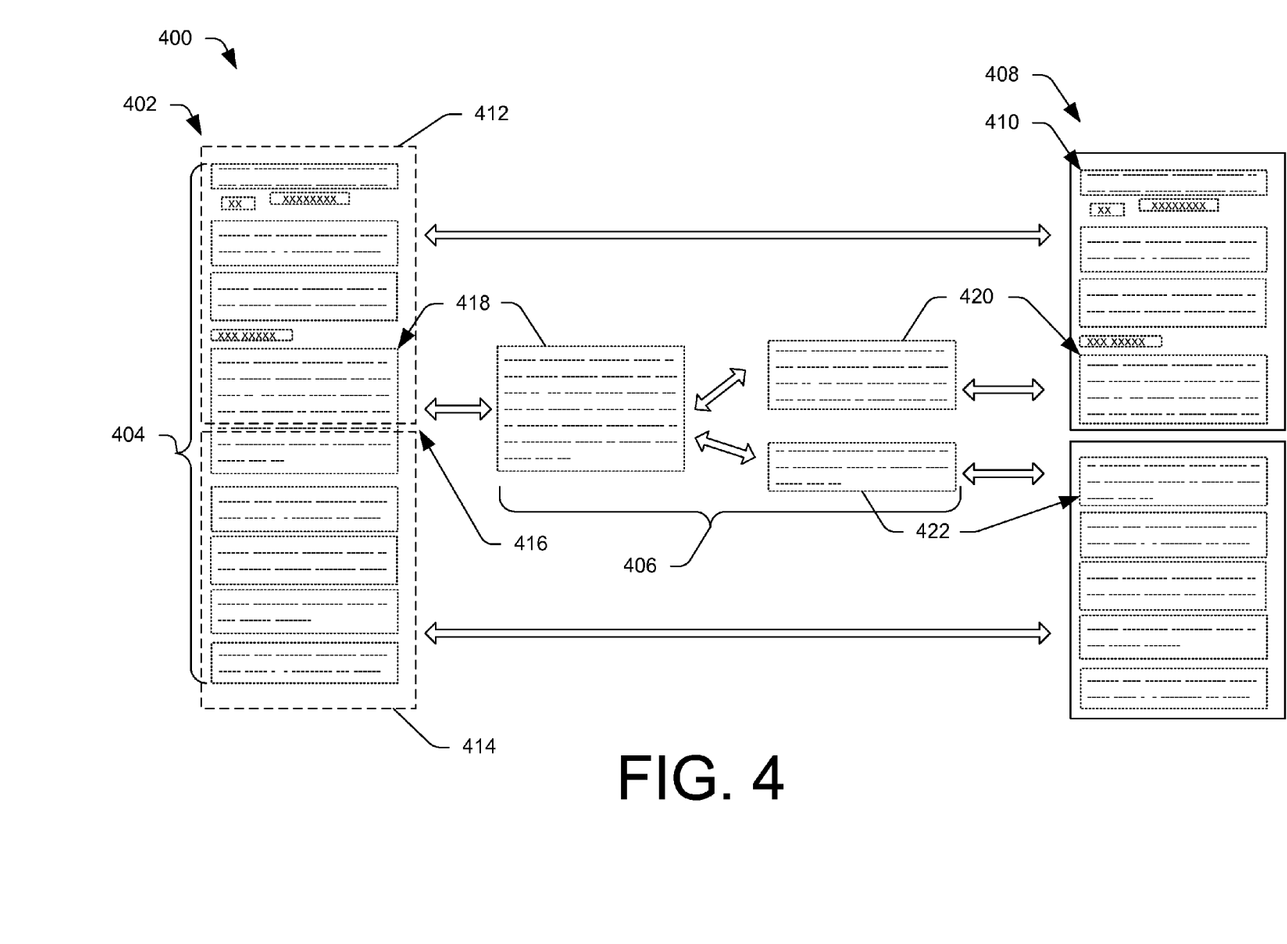
FIG. 4 is a pictorial flow diagram of an illustrative process to paginate an object based on formatting instructions from the content provider.

FIG. 4 is a pictorial flow diagram of an illustrative process 400 to paginate an object based on formatting instructions from a content provider. The process 400 is divided into three sections. A first section 402 shows a continuous flow document 404 overlaying page outlines. A second section 406 shows a break in an object (e.g., a paragraph of text or other type of object). A third section 408 shows the resulting paginated document 410. Each section is described in more detail below.

The first section 402 includes the continuous flow document 404 overlaying a first page outline 412 and a second page outline 414. A page break 416 is located between the first page outline 412 and the second page outline 414. An object 418 is shown to cross the page break 416 and thus may be subject to a division to paginate the continuous flow document 404 as the resulting paginated document 410. However, in some instances the content provider 102 may or may not want to divide an object, such as a paragraph of text, an image, a table, or other types of objects. In some embodiments, the content provider 102 may include an instruction in the formatting instructions 116 that specifies whether to divide an object or retain the object as a single object. For example, when the content provider 102 includes instructions to divide the object 418, the object may be divided into a first section 420 and a second section 422 which may be displayed on separate pages.

Example 2

Object Viewer

Figure 5:
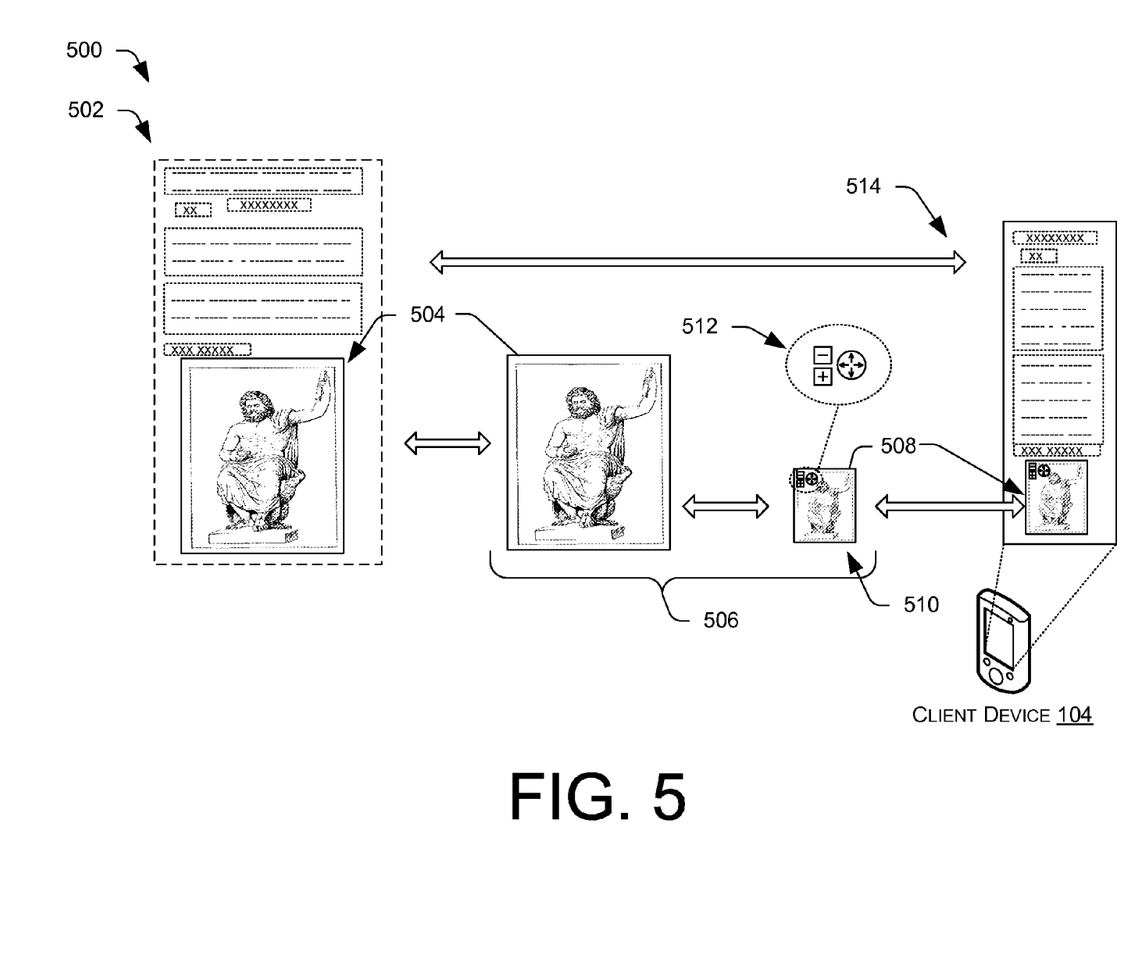
FIG. 5 is a pictorial flow diagram of an illustrative process to resize an object and possibly create a viewer for an object based on formatting instructions from the content provider.

FIG. 5 is a pictorial flow diagram of an illustrative process 500 to resize an object and possibly create a viewer for an object based on formatting instructions from a content provider. The process 500 is divided into three sections. A first section 502 shows an object 504 in an initial size. In some instances, the initial size may be greater than a size of a display of the client device 104, and thus may be resized to enable viewing of the object.

In a second section 506, the object is resized to fit within constraints based on attributes of the client device, such as an available display size. A resized object 508 may be generated by the formatting application 126 and/or the local formatting application 138. In some embodiments, the formatting instructions 116 may include preferences for an addition of a viewer 510 to enable viewing of the image in the reduced size. The viewer 510 may include various viewer controls 512 to enable a user to interact with the object. For example, if the object is an image, the viewer controls 512 may include zooming and panning controls, among other possible controls. In some instances, the formatting instructions 116 may include instructions that prevent creation and use of the viewer 510 and/or impose resizing restrictions on the object. The formatting instructions 116 may also specify that the viewer controls 512 are only visible after user interaction (e.g., selection) of the object. For example, if the object is an image and the user clicks on, hovers over, or otherwise selects the image, then the client device 104 may show the viewing controls 512. The formatting instructions 116 may also specify that the viewer 510 is shown in full screen mode. In yet another instance, the formatting instructions may specify a threshold resizing value, that when passed, indicates a preference for using the viewer 510 and the viewing controls 512.

At the third section 514, the client device 124 displays the resized object 508, which may be formatted based on the formatting instructions 116 from the content provider 102. The resized object 508 may be included in or with the viewer 510 and be presented within boundaries determined based on the display size of the client device 104.

Example 3

Special Objects/Indicators

Figure 6:
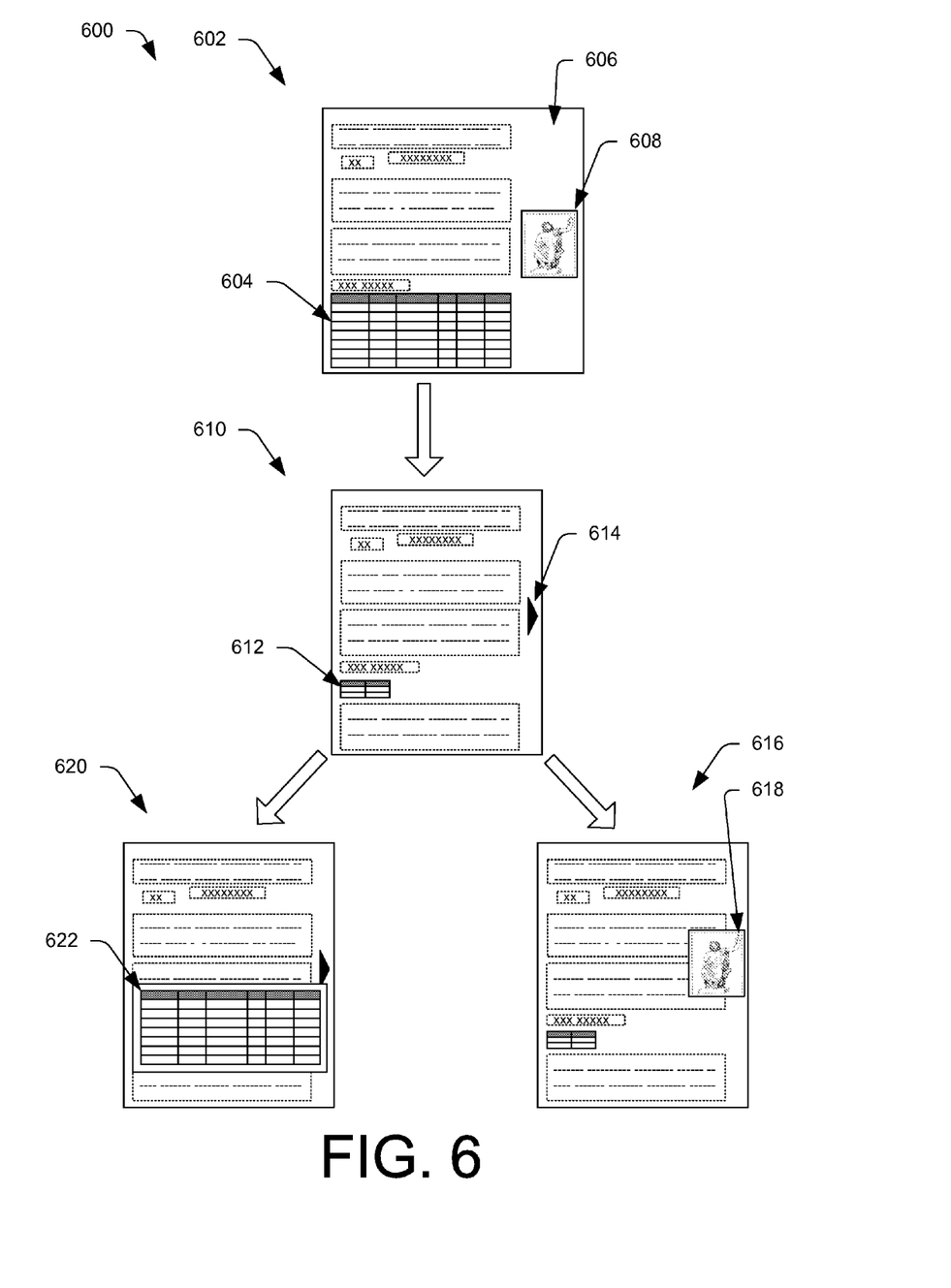
FIG. 6 is a pictorial flow diagram of an illustrative process to create a special object and an indicator based on formatting instructions from the content provider.

FIG. 6 is a pictorial flow diagram of an illustrative process 600 to create a special object and/or an indicator based on formatting instructions from a content provider. The content provider 102 may specify, via the formatting instructions 116, use of or prevent use of an indicator and/or a special object, which are discussed below.

A first section 602 shows a content that includes a first object 604, such as a table and a sidebar 606 that includes a second object 608. When the content is formatted for the client device, the first and second objects may be resized based on the device attributes, among other formatting changes that may occur.

A second section 610 shows illustrative formatting of the content that includes a special object 612 in place of the first object 604. The special object 612 may be used in place of the first object 604 due to device attributes (e.g., display size that cause space constraints, etc.) or other reasons to include the special object 612. For example, when the first object 604 is a table, the special object 612 may be an image of representative data from the table.

The second section 610 also shows another illustrative formatting of the content where an indicator 614 is in place of the second object 608. Further, the sidebar 606 is reduced or eliminated as shown in the second section 610. Sidebars are often used in printed media to fill some of a customary margin space. However, when a display space is limited, the content provider may desire to selectively remove sidebars and/or replace objects in the sidebars (i.e., the second object 608) with the indicator 614, which may indicate to a user that additional content is available.

A third section 616 shows a possible resultant object 618 upon user selection of the indicator 614. Thus, the content provider may specify that the indicator 614 is used to represent the second object 608, which when selected or activated by a user, results in a resultant object 618, which may be a full screen object or other sized object as specified in the formatting instructions 116.

A fourth section 620 shows another resultant object 622 that corresponds to the special object 612. The resultant object 622 may be the same or similar as the first object 604, which may be resized or otherwise altered (viewing controls, etc.) based on formatting instructions 116 by the content provider 102. Thus, the special object 612 may provide a link that, when selected by a user, may result in a display of the resultant object 622.

In some embodiments, the formatting instructions may specify whether a table is to be modified (resized, replaced with a special object, etc.). In some instances, the table may be used to format a page of content, and thus the content provider 102 may include formatting instructions to preserve the table without modification.

In various embodiments, the formatting instructions 116 may specify that objects in the sidebar 606, such as the second object 608, may be displayed in line or floating with the content in the body of a display. Thus, the object (e.g., image, etc.) may be moved to a location within the body of the display and the sidebar may be removed from view to maximize use of a display.

Example 4

Video Depiction

Figure 7:
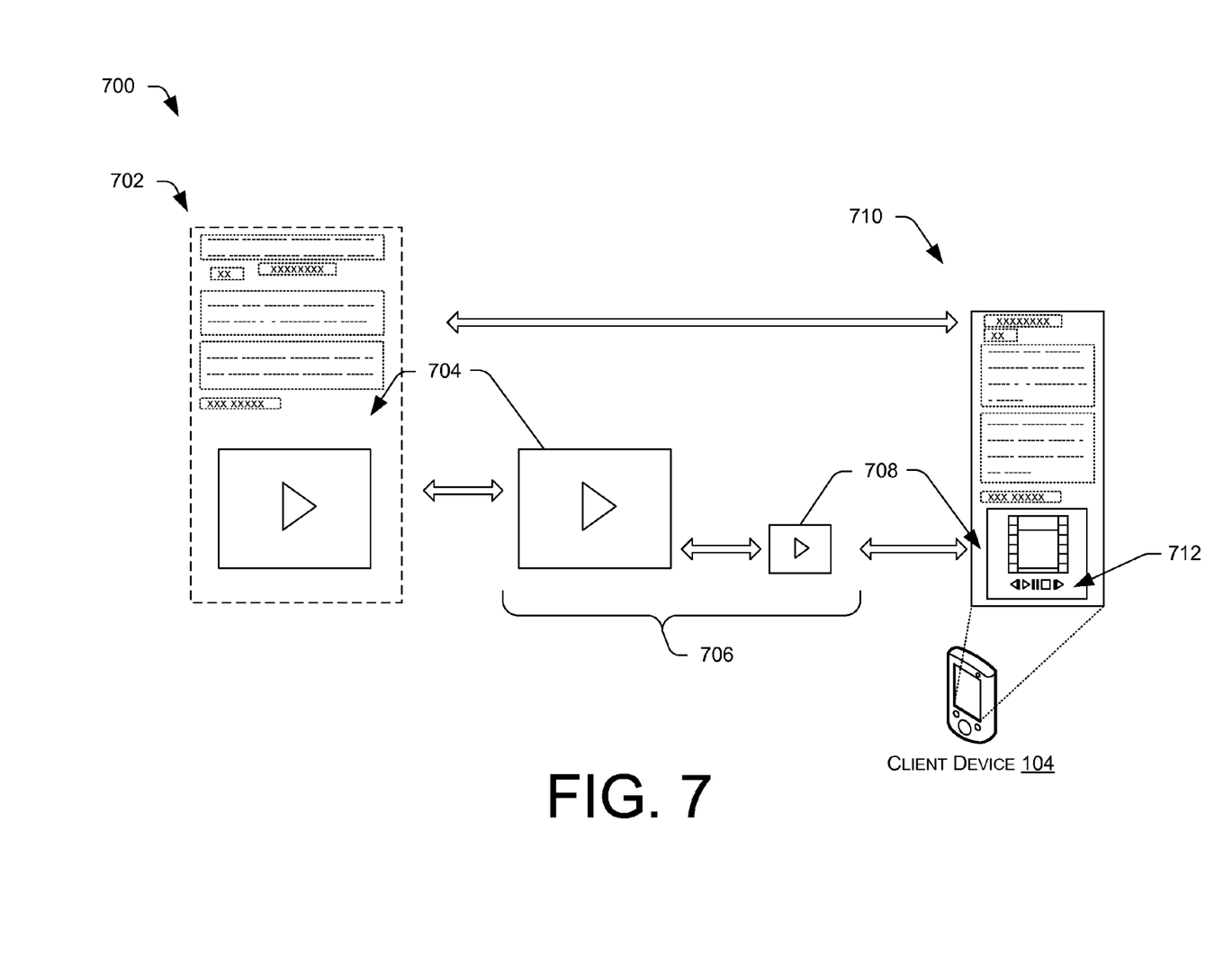
FIG. 7 is a pictorial flow diagram of an illustrative process to create a consolidated view of a video.

FIG. 7 is a pictorial flow diagram of an illustrative process 700 to create a consolidated view of a video. The content provider 102 may include formatting instructions that specify use of formatting instructions to provide the condensed view.

A first section 702 shows content that includes a video 704. The video may be included in-line with text, images, or other types of objects.

A second section 706 shows resizing of the video based on the formatting instructions 116 provided by the content provider 102 to create a resized video 708. The dimensions of the resized video may be based at least in part on the formatting instructions and/or the device attributes, such as a size of the display.

A third section 710 shows the resized video formatted with the content for display by the client device 104. The resized video 708 may include video controls 712, which may enable a user to play the video. In some instances, the content provider 102 may include formatting instructions that specify whether the video is shown in full screen mode and/or shown in a smaller window within the display of the client device 104.

In some instances, the client device may not be conducive to playing videos. For example, when the client device 104 is an electronic book reader device that uses an electric paper display, and then the client device may be unable to properly render the video. In some embodiments, the formatting instructions 116 may specify that videos should be converted to images, slideshows, filmstrips, or other static or partially static depictions that may be viewable on the client device 104. Alternatively, the formatting instructions 116 may specify that videos are to be removed from the content or otherwise made unavailable for use with some client devices.

The content provider 102 may also specify a type of video quality based on the device attributes. For example, the content provider may specify that some devices should receive video in high definition (HD) while other devices should receive the video in standard definition (SD). Besides resolution, the formatting instructions 116 may specify aspect ratio, frames/second, bit rate, or other attributes of the video that may be varied based on the device attributes. The content provider 102 may transmit to the host 106 and/or the client device 104 different versions of the video, which may be part of the special objects 118. In some embodiments, the special objects 118 may include different encodings of videos, which may be selectively implemented by the formatting instructions 116.

Example 5

Display Capabilities

Figure 8:
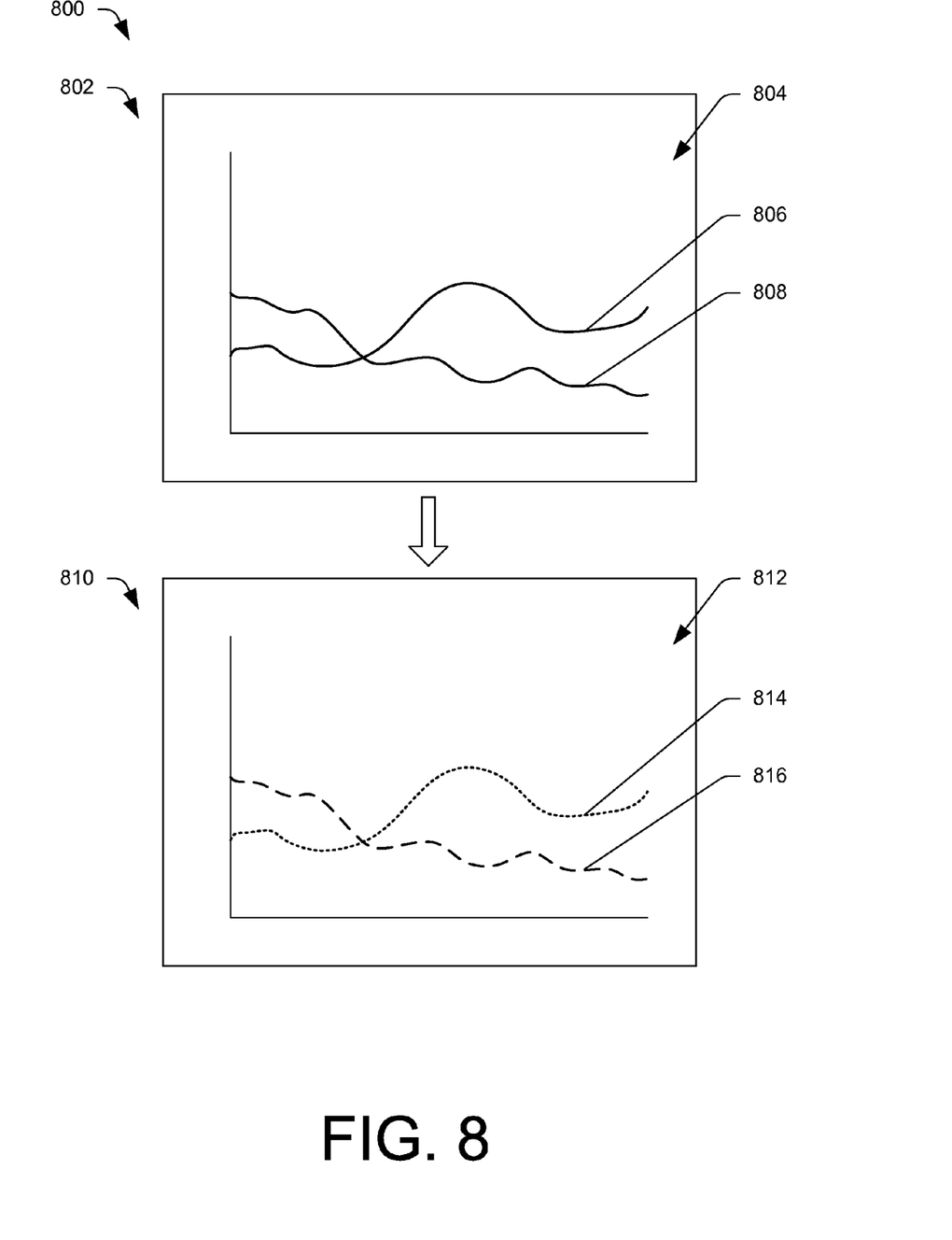
FIG. 8 is a pictorial flow diagram of an illustrative process to convert an object based on color processing capabilities of a device used to display the content.

FIG. 8 is a pictorial flow diagram of an illustrative process 800 to convert an object based on color processing capabilities of a device used to display the content. A first section 802 may include an object 804 that includes attributes, such as color. For example, a first element 806 may be designated a first color and a second element 808 may be designated a second color. A second section 810 shows an illustrative formatting result that may be specified in the formatting instructions 116. The formatting instructions 116 may specify that the object 804 should be replaced or altered when the device attributes indicate that the object may not be rendered properly. For example, when the object 804 is rendered on an electronic ink display that does not render colors, then the object may be difficult or impossible to interpret by the user. As shown in the second section 810, a new object 812 (replacement, reconfigured object, etc.) includes a new first element 814 and a new second element 816, which may be rendered and understood by the user despite possible device attributes. For example, the first color of the first element 806 may be converted to a first line style in the new first element 814, and thus distinguishable from the new second element 816 when an electronic paper display is used that cannot render color.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   under control of one or more computing devices configured with executable instructions,
   receiving content from a publisher, the content including at least a first object and a second object, wherein the second object includes information that is representative of, but different than, information that is included in the first object, wherein the first object is a table of data and the second object is an image that is representative of a portion of the data of the table;
   receiving at least one format instruction from the publisher to format at least a portion of the content in a first format when a condition is satisfied and a second format when the condition is unsatisfied;
   determining a display size of a device to receive the content;
   determining whether the condition is satisfied or unsatisfied based at least in part on the determined display size of the device;
   formatting the portion of the content for display on the device using the first format and the first object at least partly in response to determining that the condition is satisfied;
   formatting the portion of the content for display on the device using the second format and the second object at least partly in response to determining that the condition is unsatisfied; and
   transmitting the formatted content to the device.

2. The computer-implemented method as recited in claim 1, further comprising formatting content that is not subject to the at least one format instruction using default formatting instructions.

3. The computer-implemented method as recited in claim 1, wherein the at least one formatting instruction involves use of viewer controls for at least one object of the content.

4. The computer-implemented method as recited in claim 1, wherein the content is an electronic book.

5. A computer-implemented method comprising:
   under control of one or more computing devices configured with executable instructions,
   receiving, from a content provider, content that includes objects and formatting instructions that apply to at least a portion of the objects and that are different than default format instructions;
   formatting at least a portion of the objects in the content using the formatting instructions from the content provider when the formatting instructions specify formats for the objects, wherein the formatting instructions include instructions to format an object in a sidebar by replacing the object with a non-textual indicator when a display size of a client device used to display the content is less than a threshold value, the non-textual indicator causing the object to at least temporarily appear from the sidebar in response to selection of the indicator; and
   formatting objects in the content using the default formatting instructions when the formatting instructions do not specify formats for the objects.

6. The computer-implemented method as recited in claim 5, wherein the one or more computing devices is a client device, and wherein the formatting is performed by the client device.

7. The computer-implemented method as recited in claim 5, further comprising transmitting the content to a client device after the formatting.

8. The computer-implemented method as recited in claim 5, wherein the formatting instructions are implemented based at least in part on a display size used to display the content.

9. The computer-implemented method as recited in claim 5, further comprising receiving a special object from the content provider, the special object being referenced in the formatting instructions and used in place of an object based at least in part on attributes of a client device used to display the content.

10. The method as recited in claim 5, wherein the content is an electronic book.

11. The computer-implemented method as recited in claim 5, wherein the formatting instructions determine when to divide an object for pagination of a continuous flow document that includes the content.

12. The computer-implemented method as recited in claim 5, wherein the formatting the at least a portion of the objects in the content using the formatting instructions is based at least in part on device attributes of a device used to display the content.

13. The computer-implemented method as recited in claim 12, wherein the formatting instructions include at least two alternative instructions based on the device attributes.

14. The computer-implemented method as recited in claim 5, wherein execution of the formatting instructions causes the one or more computing devices to display at least one viewing control, the at least one viewing control allowing a user to alter display of one or more of the at least the portion of the objects.

15. The computer-implemented method as recited in claim 14, wherein the viewing control includes pan and zoom viewing controls to allow panning and zooming of the one or more of the at least the portion of the objects.

16. One or more non-transitory computer-readable media storing computer-executable instructions that, when executed, cause one or more processors to perform acts comprising:
   receiving, from a content provider:
      content that includes a plurality of objects, the plurality of objects including at least a first object and a second object, wherein the second object is a simplified representation of a table of actual data in the first object, the simplified representation of the table of actual data in the second object having at least one of fewer rows, fewer columns, or fewer elements than the table of actual data in the first object, and special formatting instructions for at least one object of the plurality of objects, the special formatting instructions being different than default formatting instructions for another object of the plurality of objects;

determining device attributes of a device that is used to display the content;

formatting the at least one object of the plurality of objects for display on the device using the special formatting instructions based at least in part on the device attributes; and selecting the first object or the second object, but not both, for display on the device based at least in part on the device attributes.

17. The one or more non-transitory computer-readable media as recited in claim 16, further comprising formatting the content using the default formatting instructions when the special formatting instructions do not apply based at least in part on the device attributes.

18. The one or more non-transitory computer-readable media as recited in claim 16, wherein the device attributes include at least a size of a display of the device.

19. The one or more non-transitory computer-readable media as recited in claim 16, further comprising transmitting the formatted content to the device.

20. The one or more non-transitory computer-readable media as recited in claim 16, wherein the second object is an image that is used in place of the first object of the plurality of objects based at least in part on the special formatting instructions.

21. The one or more non-transitory computer-readable media as recited in claim 16, wherein the special formatting instructions cause display of a viewer having viewing controls, the viewing controls allowing a user to alter display of the at least one object of the plurality of objects.

22. The one or more non-transitory computer-readable media as recited in claim 16, wherein the receiving the special formatting instructions occurs after the receiving the content and in a separate transmission of data than the receiving the content, and wherein the receiving the special formatting instructions occurs in response to access of the content by a client device.

23. The one or more non-transitory computer-readable media as recited in claim 16, further comprising:

transmitting an inquiry to the content provider regarding an availability of updated formatting instructions prior to the formatting; and updating the special formatting instructions with the updated formatting instructions when the updated formatting instructions are available by the content provider.

24. The one or more non-transitory computer-readable media as recited in claim 16, wherein the content is an electronic book.

25. A system, comprising:

one or more processors; and memory including instructions that, when executed, cause the one or more processors to perform acts that include:

receiving content from a content provider, the content including a first object and a second object, wherein the second object includes information that is representative of, but different than, information that is included in the first object wherein the first object is a table of data and the second object is an image that is representative of a portion of the data of the table;

receiving formatting instructions from the content provider that specify formats for the first object, the formatting instructions associated with a range of display sizes of a reader device, wherein the formatting instructions use the second object in place of the first object for at least one of the display sizes of the reader device;

determining a size of a display of the reader device;

selecting a formatting instruction from the formatting instructions based on the range that includes the size of the display; and formatting the first object or the second object using the selected formatting instruction.

26. The system as recited in claim 25, wherein execution of the formatting instructions causes display of at least one viewing control, the at least one viewing control allowing a user to alter display of at least one of the first object or the second object.

27. The system as recited in claim 25, wherein the one or more processors and the memory are implemented on the reader device that includes the display.

* * * * *